United States Patent [19]

Sugier et al.

[11] 4,197,277

[45] Apr. 8, 1980

[54] PROCESS FOR OXIDIZING SULFUR AND SULFUR COMPOUNDS

[75] Inventors: André Sugier, Rueil per atlas Malmaison; Philippe Courty, Houilles; André Deschamps, Noisy le Roi; Henri Gruhier, Chatillon sous Bagneux, all of France

[73] Assignee: Institut Francais du Petrole, Rueil-Malmaison, France

[21] Appl. No.: 847,870

[22] Filed: Nov. 2, 1977

[30] Foreign Application Priority Data

Nov. 2, 1976 [FR] France .................................. 76 33207

[51] Int. Cl.$^2$ .............................................. B01D 53/34
[52] U.S. Cl. ................. 423/231; 423/573 G; 252/464; 423/542
[58] Field of Search ................. 423/230, 231, 573 G, 423/576, 542; 252/464, 466 J

[56] References Cited

U.S. PATENT DOCUMENTS

| | | | |
|---|---|---|---|
| 2,083,894 | 6/1937 | Connolly | 423/573 G |
| 3,297,588 | 1/1967 | Kehl et al. | 252/464 |
| 4,044,114 | 8/1977 | Dezael et al. | 423/576 |
| 4,069,140 | 1/1978 | Wunderlich | 208/251 H |

FOREIGN PATENT DOCUMENTS

| | | | |
|---|---|---|---|
| 223904 | 11/1957 | Australia | 423/573 G |
| 5070 | of 1883 | United Kingdom | 423/573 G |
| 867853 | 5/1959 | United Kingdom | 423/573 G |

*Primary Examiner*—O. R. Vertiz
*Assistant Examiner*—Thomas W. Roy
*Attorney, Agent, or Firm*—Millen & White

[57] ABSTRACT

Sulfur and sulfur compounds contained in a gas are oxidized in contact with a catalyst comprising vanadium oxide, iron oxide and alumina, said catalyst having a surface higher than 30 m$^2$/g and being obtained by impregnation of aluminum with soluble vanadium and iron compounds.

15 Claims, No Drawings

PROCESS FOR OXIDIZING SULFUR AND SULFUR COMPOUNDS

The present invention concerns a process for the catalytic oxidation of sulfur or sulfur compound pollutants contained in a gas.

Certain industrial gases, for example waste-gas from Claus ovens, contain, in addition to unconverted hydrogen sulfide, non-negligible amounts of carbon oxysulfide, carbon disulfide and sulfur. An effluent which contains such diverse sulfur compounds must be treated so as to result in only one type of compound, particularly sulfur dioxide.

Certain effluents from the chemical industry contain hydrogen sulfide, sulfides and light mercaptans which are toxic and malodorous. The purifications will consist in converting these compounds to sulfur and sulfur dioxide, depending on the amount of oxygen, this amount being well-known to skilled people. The present process can thus be substituted for the conventional Claus process.

Other industrial gases contain as the essential pollutants, besides sulfur compounds, hydrocarbons, formaldehyde, alcohols, phenol derivatives, carbon monoxide and, as a rule, organic compounds, which must be converted to non-pollutant compounds such as carbon dioxide and water by complete oxidation.

The pyrolysis of such compounds as above described requires high temperatures for the gas to be treated, on the order of 600° to 850° C.; this process also requires high oxygen amounts for good performance, which in some cases requires a high dilution and substantially increases the amount of gas to be preheated.

A catalytic process, however, has the essential advantage of permitting the oxidation to be initiated at a largely lower temperature, possibly 150° to 200° C., particularly when the treated gas contains hydrogen sulfide; it also requires relatively low oxygen contents, for example 1.5 to 5 times the theoretical amount of oxygen necessary to complete oxidation.

It has been proposed heretofore to use catalysts of vanadium oxide associated with bauxite to realize this type of catalytic oxidation of sulfur or oxidizable sulfur compounds. Starting with sulfur, the main product is sulfur dioxide; starting with $H_2S$, COS or $CS_2$, the products are sulfur and/or sulfur dioxide, depending on the amount of available oxygen.

These catalysts can also be used to eliminate oxygen contained in low proportion in a gas containing sulfur or oxidizable sulfur compounds, as is the case, for example, in the Claus units.

These known catalysts have however the double disadvantage of a relatively low activity, (which necessitates the, use of relatively low gas circulation rates) and a short life time.

The catalysts which are used according to this invention have a fairly higher activity and life time. Their preparation is based on the use of vanadium and iron both in the form of soluble compounds (contrary to the use of bauxite) which are impregnated into alumina, preferably of a particular type.

The content of vanadium oxide in the catalyst is preferably between 1 and 10% b.w., the content of iron oxide ranging from 1 to 40%.

The specific surface of the catalyst is higher than 30 $m^2/g$ and preferably 50 to 300 $m^2/g$.

The active elements may be deposited on a performed alumina carrier, for example balls of 1–15 mm diameter, or extrudates or tablets of 1–15 mm diameter, through one or more impregnations of solutions of soluble salts, or impregnated on the powdered alumina carrier and then shaped, or admixed as salts with the wet alumina carrier. Alumina may be present as gel, powder or decomposable compound.

In certain cases, particularly when treating a gas containing carbon oxysulfide and/or carbon disulfide at a temperature lower than 350° C., it has been found that the activity of the catalysts could be greatly increased by adding either 500 to 30,000 ppm b.w. of silver or 1 to 20% b.w. of titanium oxide or a mixture of both.

Silver and/or titanium oxide may be added together with the other elements, either by coimpregnation on the preformed carriers or by admixing with the other elements or impregnation of the carrier before shaping, or added after the other elements by impregnation.

Examples of iron salts are iron nitrate, chloride, sulfate or the carboxylates. Vanadium is introduced, for example, in the form of vanadium ammonium sulfate, vanadium oxalate, ammonium metavanadate in solution in an aqueous organic acid, or vanadic acid in solution in an aqueous acid.

For the impregnation, alumina may be used as powder; however catalysts of largely higher activity and stability are obtained by using performed alumina agglomerates, for example balls, tablets, pills or extrudates having a surface of 50 to 300 $m^2/g$ and a porosity of 0.2 to 1 $cm^3$ per gram. Balls are preferred. The agglomerates are usually obtained by agglomeration of alumina powder followed with drying and activation heating at 500°–1000° C. They have a minimal size of 1 mm and preferably in the range of 2–4 mm.

The pore distribution of the alumina agglomerates is of importance: the catalysts of highest activity and stability (a plant of industrial size has been operated successfully for 2 and a half years) are obtained from alumina agglomerates of a pore volume of 0.4 to 0.8 cc/g and a pore distribution corresponding to at least 0.1 ml/g of pores of diameter higher than 300 Å and at least 0.05 ml/g of pores of diameter higher than 1,000 Å.

Preferred alumina agglomerates satisfying this condition of pore distribution may be obtained by subjecting fresh alumina agglomerates of surface higher than 120 $m^2/g$ to a treatment with steam under pressure at a temperature of 110°–300° C., preferably 150°–250° C., for at least 15 minutes, by drying the resultant agglomerates and heating them to 500°–1000° C., preferably for at least 15 minutes.

The impregnation of the catalytic elements is followed with drying, for example at 100°–300° C., then thermal activation by heating, for example at 350°–600° C., preferably 400°–550° C.

Excessively high temperatures, for example higher than 700° C., are preferably avoided during this activation heating, since an undesirable reaction between alumina and the active elements could otherwise take place, which would decrease the activity and stability of the catalyst.

These catalysts may be used at temperatures higher than 150° C., for example at 200°–700° C. and preferably 300°–600° C. The catalysts are preferably used in such amounts that the VVH be between 1,000 and 30,000 and usefully between 2,000 and 10,000 (VVH=volume of treated gas per volume of catalyst per hour).

According to the invention, the air may be introduced at one point of the plant or preferably at several points, so as to limit any local overheating; this may be obtained, for example, by dividing the catalyst bed into several sections.

When the gas to be treated contains organic sulfur compounds, it may be more advantageous to have this combustion step preceeded with a step of hydrolysis with steam. This may be effected, for example, according to a technique described in the French Pat. No. 2,123,778.

This hydrolysis step may also be applied to the catalysts employed in the invention. In that case the injection of air is carried out at an intermediate point of the catalyst bed, the first part of the catalyst bed being then designed for hydrolysis of the organic sulfur compounds.

The following examples are given for illustration purposes and are not to be interpreted as limiting the scope of the invention.

CATALYST A 5,400 ml of an aqueous solution obtained by dissolution of 510 g of ammonium metavanadate, 650 g of oxalic acid and then 1,650 g of iron nitrate into water are used to impregnate 10 kg of alumina balls of 3–5 mm size, 95 m$^2$/g specific surface and 57 ml/100 g total pore volume.

After impregnation, it is subjected to drying for 2 h at 250° C. and then heating for 4 h at 550° C. in the presence of air.

The resulting catalyst has the following composition in % b.w.:

$Al_2O_3$ carrier: 93.2; $V_2O_5$: 3.8; $Fe_2O_3$: 3.0

The specific surface is 87 m$^2$ g$^{-1}$.

The starting alumina balls, which comprised 0.16 ml/g of pores higher than 300 Å and 0.11 ml/g of pores higher than 1,000 Å, had been obtained from freshly prepared alumina balls by heating for 4 h at 220° C. in an autoclave, in the presence of saturated steam, followed with calcining at 700° C. for 4 h.

CATALYST B 1 kg of catalyst A previously described is impregnated with 540 ml of a solution containing 6.3 g of silver nitrate; it is then dried at 200° C. for 2 hours and treated for 4 h at 550° C. in air.

The weight of silver thus deposited is 4 g, i.e. a proportion of about 0.4% b.w.

The specific surface is 92 m$^2$ g$^{-1}$.

CATALYST C 1 kg of catalyst B is impregnated with 540 ml of an aqueous solution of 1.15 mole titanium oxychloride per liter, and then dried for 2 h at 200° C. and treated for 4 h at 550° C. in air.

The weight of titanium oxide thus deposited is 50 g, thus a proportion of about 5% b.w.

CATALYST D 3.8 g of vanadium pentoxide is dissolved into 50 ml of water containing 13 g of oxalic acid; 7.6 g of Fe (NO$_3$)$_3$ 9 H$_2$O is then added. The resulting solution is used to impregnate 93.2 g of alumina powder of 300 m$^2$/g in surface area and grain size lower than 0.1 mm. The resulting composition is dried for having a 3 h at 120° C., then maintained in air for 12 h at 450° C. or made with tablets of 4 mm height and 4 mm diameter. The resulting catalyst has the following composition by weight:

$V_2O_5$: 3.8% $Fe_2O_3$: 3% $Al_2O_3$: 93.2%

CATALYST E (comparison)

3.8 g of vanadium pentoxide is dissolved into 46 ml of water containing 13 g of oxalic acid. The resulting solution is used to impregnate a mixture of 85.5 g of alumina powder identical to that of catalyst D and 10.7 g of bauxite (Fe$_2$O$_3$ content: 28%) of grain size lower than 0.1 mm. It is then processed as was catalyst D (drying, etc). The resulting catalyst has the same composition as catalyst D.

EXAMPLE 1

10,000 Nm$^3$/hour of waste-gas from a Claus unit, whose composition is as follows:

| | |
|---|---|
| SO$_2$ | 0.4% |
| H$_2$S | 0.8 |
| CS$_2$ | 0.1 |
| COS | 0.4 |
| S (vapor + droplets) | 0.15 |
| H$_2$O | 29 |
| CO$_2$ | 5 |
| H$_2$ | 1 |
| N$_2$ | 63.15 | are heated by admixture with combustion gas from an auxiliary burner and introduced with an air excess of about 20% into a post-combustion chamber (incinerator) whose volume is 3 m$^3$ and wherein a catalyst has been placed. Taking the addition of air and combustion gas into account, the gas flow rate at the outlet from the incinerator is about 13,000 m$^3$ per hour.

Depending on the run conditions in the incinerator (temperature in °C., nature of the catalyst), the following results have been obtained for the composition of the effluent at the outlet, the volume of catalyst being 2 m$^3$.

| Content of pollutants(2) | Operating conditions CATALYST A T = 300 (1) | | CATALYST B | | CATALYST C | |
|---|---|---|---|---|---|---|
| | | T = 600 | T = 300 | T = 600 | T = 300 | T = 600 |
| H$_2$S | 50 | < 5 | 15 | < 5 | 10 | < 5 |
| CS$_2$ | 450 | <10 | 100 | <10 | 80 | <10 |
| COS | 600 | <10 | 250 | <10 | 200 | <10 |
| S | 200 | < 5 | 30 | <10 | 20 | <10 |

(1)Temperature in °C.
(2)ppm by volume.

In a second run, these 10,000 Nm³/h have been treated in two serially arranged reactors containing each 2 m³ of identical catalyst.

The first reactor is maintained at 300° C.; air is supplied between the first and second reactor, in such an amount that the oxygen content at the outlet of the reactor is 0.5%.

The first reactor is thus used for preliminary hydrolysis, the second for incineration. It is noted that this technique may be used with only one reactor, provided air is supplied at an intermediary point of the reactor.

An analysis of the effluent at the outlet has yielded the following results (the temperature given in the table is that of the incinerator).

| Content of pollutants(2) | Operating conditions CATALYST A T = 300 (1) | CATALYST A T = 600 | CATALYST B T = 300 | CATALYST B T = 600 | CATALYST C T = 300 | CATALYST C T = 600 |
| --- | --- | --- | --- | --- | --- | --- |
| $H_2S$ | 70 | < 5 | 40 | < 5 | 25 | < 5 |
| $CS_2$ | 100 | <10 | 40 | <10 | 20 | <10 |
| COS | 200 | <10 | 110 | <10 | 50 | <10 |
| S | 200 | < 5 | 30 | <10 | 20 | <10 |

(1)Temperature in °C.
(2)ppm by volume.

EXAMPLE 3

The experiments had the object of eliminating traces of oxygen present in a $H_2S$ containing gas, as is the case in Claus units.

The experiments have been conducted with a gas delivered at the outlet of a Claus unit after condensation of sulfur. Its composition in % by volume was as follows:

| | |
| --- | --- |
| $H_2S$ | 4.8% |
| $SO_2$ | 2.4% |
| $CO_2$ | 4.9% |
| CO | 0.1% |
| $N_2$ | 60.7% |
| $O_2$ | 0.3% |
| $H_2O$ | 26.2% |
| COS + $CS_2$ | 0.6% |

The catalyst is arranged in a reactor and the temperature is 230° C. The volume of gas (NTP) delivered per hour and per volume of catalyst is 5,000 (VVH).

At the outlet from the reactor, the oxygen content (in ppm) is determined:

| CATALYST | $O_2$ AT THE OUTLET |
| --- | --- |
| A | 30 |
| B | 30 |
| C | 30 |

The limit of sensitivity of the analytical device is 30 ppm of oxygen. The content of COS and $CS_2$ at the outlet is also determined, as well as the amount of sulfur formed, and this is indicated in the following table as % of the combined sulfur of the charge ($H_2S$, $SO_2$, $CS_2$, COS)

% S = (formed S/S($H_2S+SO_2+CS_2+COS$))

| CATALYST | % COS + $CS_2$ at the outlet | % S |
| --- | --- | --- |
| A | 0.3 | 70 |
| B | 0.3 | 71 |
| C | 0.2 | 74 |

These results show that oxygen has been practically totally eliminated with simultaneous hydrolysis of COS and $CS_2$ and production of sulfur.

EXAMPLE 4

Sulfur has been produced from an acid gas containing $H_2S$, as is the case for effluents from coal or oil bottoms gasifying.

| The gas had the following composition by volume | |
| --- | --- |
| $H_2S$ | 1% |
| $CO_2$ | 92.5% |
| $H_2O$ | 2.5% |
| $CH_4$ | 1% |
| $C_4H_8$ | 0.5% |
| air | 2.5% |

The catalyst was placed in a reactor whose inlet temperature was 175° C. The volume of gas (NTP) per hour and per volume of catalyst was 2,000 (VVH).

At the outlet from the reactor, sulfur was determined; the yields of sulfur, reported on the basis of the $H_2S$ content at the inlet, are given in the following Table:

| Catalyst | Yield of sulfur (%) |
| --- | --- |
| A | 90 |
| B | 90 |
| C | 91 |

EXAMPLE 5

0.15 Nm³/hour of waste-gas discharged from a Claus unit and whose composition is as given in Example 1 are admixed with 1.3 times the amount of air theoretically required for oxidizing sulfur and the sulfur compounds to $SO_2$, and fed to a reactor containing 30 ccm of catalyst.

The following results have been obtained:

| Content of pollutants ppm (volume) | CATALYST D T = 300 | CATALYST D T = 600 | CATALYST E T = 300 | CATALYST E T = 600 |
| --- | --- | --- | --- | --- |
| $H_2S$ | 260 | 15 | 320 | 40 |
| $CS_2$ | 640 | 10 | 850 | 40 |
| COS | 820 | 30 | 1120 | 170 |
| S | 230 | 5 | 290 | 15 |

T = temperature in °C.

This example shows that catalyst D obtained from powdered alumina is not as good as catalyst A obtained from preformed alumina.

Catalyst E which forms no part of the invention and wherein iron had been introduced in the form of bauxite, gives less satisfactory results then catalyst D which conforms to the invention.

What we claim is:

1. In a process for oxidizing an oxidizable sulfur compound being at least one of sulfur, $H_2S$, COS or $CS_2$ in the gas phase, wherein said sulfur compound in mixture with a gas containing molecular oxygen, is contacted with a catalyst of specific surface higher than 30 $m^2$/g, which contains vanadium oxide, iron oxide and alumina, the improvement wherein the catalyst results from a process comprising impregnating alumina agglomerates with at least one dissolved vanadium compound and at least one dissolved iron compound, said agglomerates having a pore volume of 0.4 to 0.8 $cm^3$/g with at least 0.1 cc/g of pores of diameter higher than 300 Å and at least 0.05 cc/g of pores of diameter higher than 1,000 Å, the resultant catalyst containing 1-10% by weight of vanadium oxide and 1-40% by weight of iron oxide.

2. A process according to claim 1, wherein the oxidizable compound is hydrogen sulfide and sulfur is the product.

3. A process according to claim 1, wherein the oxidizable compound is hydrogen sulfide in admixture with at least one of carbon oxysulfide and carbon disulfide.

4. A process according to claim 1, wherein the resultant catalyst also contains 500 to 30,000 parts by weight of silver per million.

5. A process according to claim 1, wherein the resultant catalyst also contains 1 to 20% b.w. of titanium oxide.

6. A process according to claim 1, wherein the sulfur compound comprises at least one of carbon oxysulfide and carbon disulfide and the gas is previously passed through a steam hydrolysis unit.

7. A process according to claim 1, wherein the impregnation of alumina is effected with an aqueous solution of vanadium and iron compounds.

8. A process according to claim 1, wherein the alumina agglomerates result from the treatment of fresh alumina agglomerates with steam under pressure at 110°-300° C., followed with heating at 500°-1000° C.

9. A process according to claim 1, wherein the sulfur compound comprises at least one of carbon oxysulfide and carbon disulfide and is previously passed through a steam hydrolysis unit containing a catalyst such as defined in claim 1.

10. A process according to claim 1, wherein said dissolved iron compound is iron nitrate, chloride, sulfate, or carboxylate, and said vanadium compound is vanadium ammonium sulfate, vanadium oxalate, ammonium metavanadate, or vanadic acid.

11. A process according to claim 1, wherein the process of producing the catalyst comprises the further steps of drying and thermally activating the resultant dried catalyst at a temperature of about 350°-600° C.

12. A process according to claim 11, wherein the thermal activation temperature is about 400°-550° C.

13. A process according to claim 1 wherein the oxidizing process is conducted at a temperature higher than 150° C.

14. A process according to claim 1 wherein the oxidizing process is conducted at 200°-700° C., the oxidizing process being used to treat the waste-gas from a Claus unit, and wherein the sulfur compounds in said waste gas are oxidized to $SO_2$.

15. A process according to claim 14 wherein the process is conducted at 300°-600° C.

* * * * *